(12) United States Patent
Hjortland (10) Patent No.: US 11,275,165 B2
(45) Date of Patent: Mar. 15, 2022

(54) PULSED RADAR

(71) Applicant: Novelda AS, Kviteseid (NO)

(72) Inventor: Håkon André Hjortland, Oslo (NO)

(73) Assignee: Novelda AS, Kviteseid (NO)

( * ) Notice: Subject to any disclaimer, the term of this patent is extended or adjusted under 35 U.S.C. 154(b) by 242 days.

(21) Appl. No.: 16/483,165

(22) PCT Filed: Feb. 1, 2018

(86) PCT No.: PCT/EP2018/052579
§ 371 (c)(1),
(2) Date: Aug. 2, 2019

(87) PCT Pub. No.: WO2018/141877
PCT Pub. Date: Aug. 9, 2018

(65) Prior Publication Data
US 2020/0003881 A1 Jan. 2, 2020

(30) Foreign Application Priority Data

Feb. 3, 2017 (GB) ...................... 1701862

(51) Int. Cl.
*G01S 13/20* (2006.01)
*G01S 7/282* (2006.01)
(Continued)

(52) U.S. Cl.
CPC .............. *G01S 13/20* (2013.01); *G01S 7/282* (2013.01); *G01S 13/106* (2013.01); *G01S 13/0209* (2013.01)

(58) Field of Classification Search
CPC .... G01S 13/0209; G01S 13/106; G01S 13/20; G01S 7/282
See application file for complete search history.

(56) References Cited

U.S. PATENT DOCUMENTS 3,663,935 A 5/1972 MacMullen
3,742,199 A * 6/1973 Lubarsky ............ H04L 25/4904
341/95
(Continued)

FOREIGN PATENT DOCUMENTS

CN 1653709 A 8/2005
CN 102365560 A 2/2012
DE 38 11 283 A1 10/1989

OTHER PUBLICATIONS

International Search Report and Written Opinion for PCT/EP2018/052579, dated May 22, 2018.

*Primary Examiner* — Timothy X Pham
(74) *Attorney, Agent, or Firm* — Klarquist Sparkman, LLP (57) ABSTRACT

According to a first aspect, a pulsed radar comprises a transmitter; wherein the pulsed radar is arranged to generate a string of binary values; wherein the transmitter comprises a pulse generator arranged to generate a pulse signal comprising a series of transmit pulses with polarities determined in accordance with the string of binary values; wherein a first substring comprises a first series of values; wherein a second substring comprises a second series of values; wherein the second substring is different from the first substring; and wherein each value in the second series of values is either the same as or different from the corresponding value in the first series of values according to a repeating pattern; and wherein the string of binary values comprises at least the first substring and the second substring concatenated together and each optionally being reversed before concatenation.

21 Claims, 6 Drawing Sheets

(51) Int. Cl.
*G01S 13/10* (2006.01)
*G01S 13/02* (2006.01)

(56) References Cited

U.S. PATENT DOCUMENTS

| | | | |
|---|---|---|---|
| 4,513,386 A * | 4/1985 | Glazer | H03K 3/84 |
| | | | 708/255 |
| 5,151,698 A * | 9/1992 | Pophillat | H04B 14/026 |
| | | | 341/52 |
| 5,151,702 A | 9/1992 | Urkowitz | |
| 5,440,311 A | 8/1995 | Gallagher et al. | |
| 2004/0150458 A1* | 8/2004 | Gupta | H03M 1/12 |
| | | | 327/407 |
| 2013/0141270 A1* | 6/2013 | Rodenbeck | G01S 13/0209 |
| | | | 342/137 |

\* cited by examiner

PULSED RADAR

CROSS REFERENCE TO RELATED APPLICATIONS

This is the U.S. National Stage of International Application No. PCT/EP2018/052579, filed Feb. 1, 2018, which was published in English under PCT Article 21(2), which in turn claims the benefit of Great Britain Application No. 1701862.3, filed Feb. 3, 2017.

The invention relates to pulsed radar systems such as ultra-wide band radar systems. In particular, the invention may be employed in pulsed radars with a swept-threshold receiver, although it also applies more generally. More specifically the invention relates to the removal of noise and/or unwanted reflections from the received signal in such devices.

Figure 1:
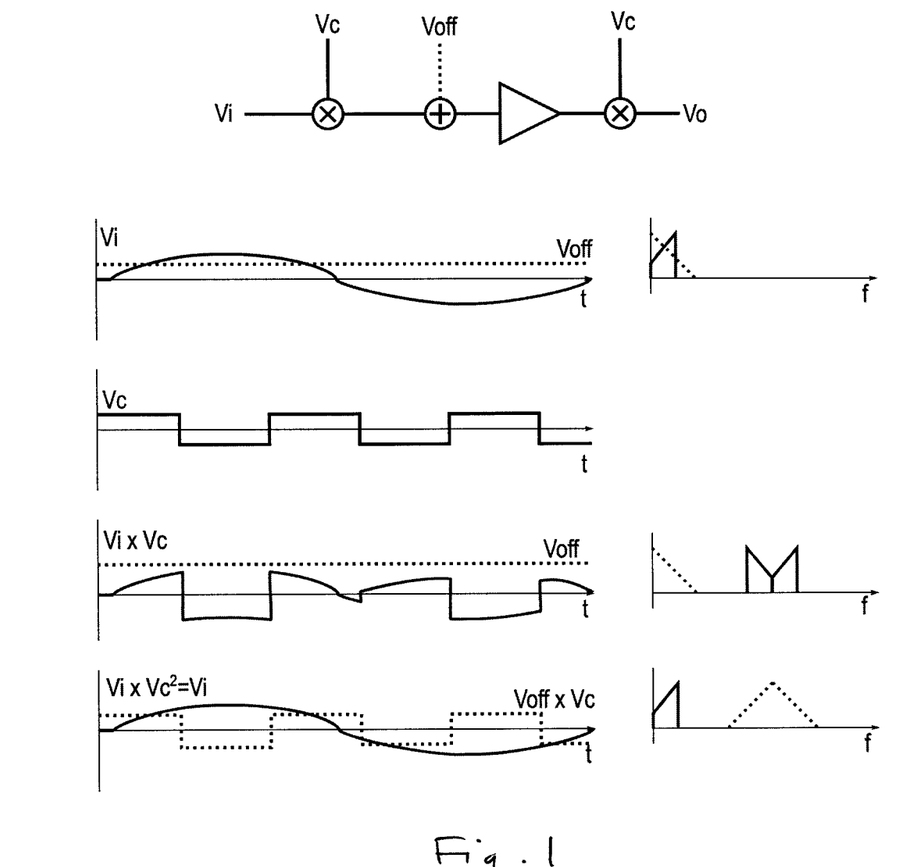
FIG. 1 shows a standard chopping architecture and its operation and associated signals.

By way of background, a known chopping amplifier circuit is described here. The chopping amplifier, as shown in FIG. 1, is commonly used to suppress unwanted DC offsets and low frequency noise in amplifiers. The input signal, Vi, is first multiplied by the chopping signal, Vc, before the unwanted offset voltage Voff is added to the signal by the amplifier. The signal is then multiplied again with the same chopping signal. The key here is that the wanted signal is multiplied twice, while the unwanted offset is multiplied only once. Looking at the frequency spectrums of the signals (shown to the right of the signal waveforms), it can be seen that the DC offset has been shifted away from the desired signal (and out-of-band of the desired signal). By low-pass filtering the result, only the desired signal is left, without the offset.

Also by way of background, a known receiver architecture for receiving signal waveforms in an impulse radar system using a swept threshold range profile digitizer system is illustrated in FIG. 2.

Figure 2A:
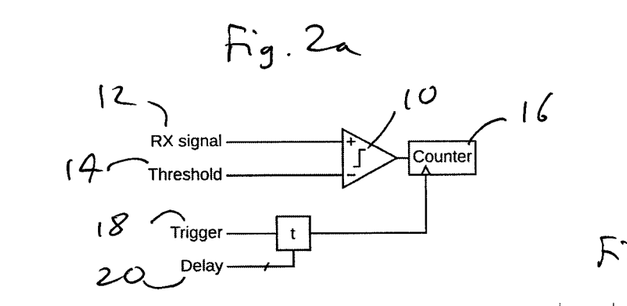
FIG. 2 shows a swept-threshold receiver architecture and associated signals.

FIG. 2a shows a comparator 10 that receives the received (RX) signal 12 and a threshold signal 14. The comparator is a standard 1-bit comparator. It compares the two inputs and outputs a high signal (high voltage rail) if the received signal 12 is higher than the threshold 14 and a low signal (low voltage rail) otherwise, thus quantizing the incoming received signal 12. Pulses are transmitted repeatedly at a pulse repetition frequency (PRF). After each pulse is transmitted and received the threshold signal 14 is changed and the comparison is performed again, thus comparing the received signal 12 against a different threshold (for a high PRF, the received signal is expected to be substantially identical for successive pulses as any movement of reflectors within the range is assumed to be slow compared with the pulse repetition rate, i.e. it is assumed that each reflected signal will closely match the preceding and following signal). By sweeping the threshold signal 14 incrementally through a defined range of voltages in small increments, a thermometer code of the signal level is produced. By counting (and hence summing over time) the comparator output after each pulse (the counter 16 incrementing if the comparator 10 outputs high and not incrementing if the comparator 10 outputs low), the thermometer coded output is turned into a multi-bit sample value of the received signal 10. In the following, the term "swept-threshold" is used to describe this technique.

Figure 2B:
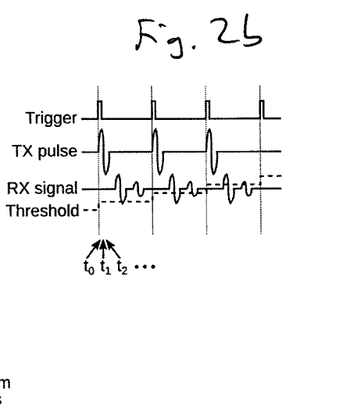

In FIG. 2a the counter 16 is triggered by the trigger signal 18 that is also used to generate transmit (TX) pulses. A delay 20 provides the range gate, i.e. the time at which to sample the receive signal 12 (and thus the distance or range at which to look for reflections). FIG. 2b illustrates the signals involved, with the trigger signal shown at the top (four individual pulses in the pulse stream are shown, these being generated at the PRF), the transmit pulse that is generated by that trigger signal is shown on the second line, the received signal 12 on the third line (showing two reflections from each transmit pulse) and the step-wise increasing threshold signal 14 on the fourth line.

Figure 2C:
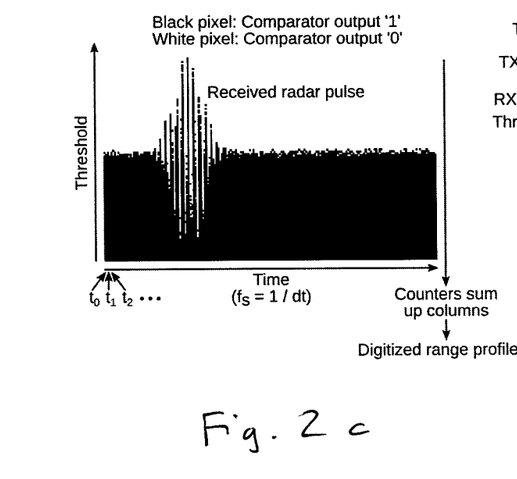

By simultaneously sampling the received signal at multiple range points (i.e. at multiple different times from pulse transmission), an accurate digitized version of the range profile can be constructed, the value for each range point being stored in a separate counter. A portion of a range profile is illustrated in FIG. 2c, each range point in time (x-axis) being represented by a thermometer coded value (y-axis).

A further problem with pulsed radars is that they have a maximum range at which they can operate unambiguously. This is determined by the PRF and corresponds to the distance from which all reflections of a transmitted pulse can be received before the next pulse is transmitted. The Maximum Unambiguous Range (MUR) may be calculated from the Pulse Repetition Interval as follows: MUR=PRI*c/2, where c is the speed of light. The range from the radar device to the MUR is the unambiguous range interval, the range from MUR to 2×MUR is the first ambiguity range interval, the range from 2×MUR to 3×MUR is the second ambiguity range interval, and so on. The unambiguous range interval may also be considered as ambiguity range interval zero. It should be noted that the ambiguity range closest to the radar device is not always the range of interest, although this is most often the case.

If no special technique is applied, reflections from the $n^{th}$ range interval would appear as though they were in the unambiguous range interval. In many cases, these pulses are so weak that they don't cause any practical problem. However, if the target in the $n^{th}$ ambiguity range interval is significantly larger than the desired target in the unambiguous range interval, they can be problematic. This might be the case for example where the radar is being used to detect something very small (or that reflects very weakly) in the unambiguous range. A large or strong reflector in the ambiguity ranges may then be of greater amplitude than the desired signal which will result in an incorrect sampled range profile.

In pulsed radar systems, a common method of suppressing the unwanted reflections is by staggering the PRI using a pseudo-random sequence. This decorrelates the unwanted pulses, effectively turning them into noise. Another method is to employ bi-phase pulses, and apply a pseudo-random pattern to the transmitted pulses. As with the staggering, the unwanted pulses appear as noise. The amount of noise is defined by the autocorrelation properties of the pseudo-random pattern. Typically, m-sequences (maximum length sequences) are used, but other types of codes/sequences can be used such as Barker codes and ternary codes. By integrating pulses for the exact length of an m-sequence, the unwanted reflections will end up as weak non-noisy signals. Using ternary codes, for its exact length, it is possible to completely eliminate the effects of the unwanted reflections, but some pulses must be sent with amplitude 0, i.e. not sent at all, which can represent an efficiency problem.

However, although the unwanted pulses might be reduced to noise, they will still be present in the range profile as a bump in the noise floor. To simplify further discussion, these unwanted pulses (or bumps), in all their forms, will be referred to herein as "ghost pulses".

Figure 3:
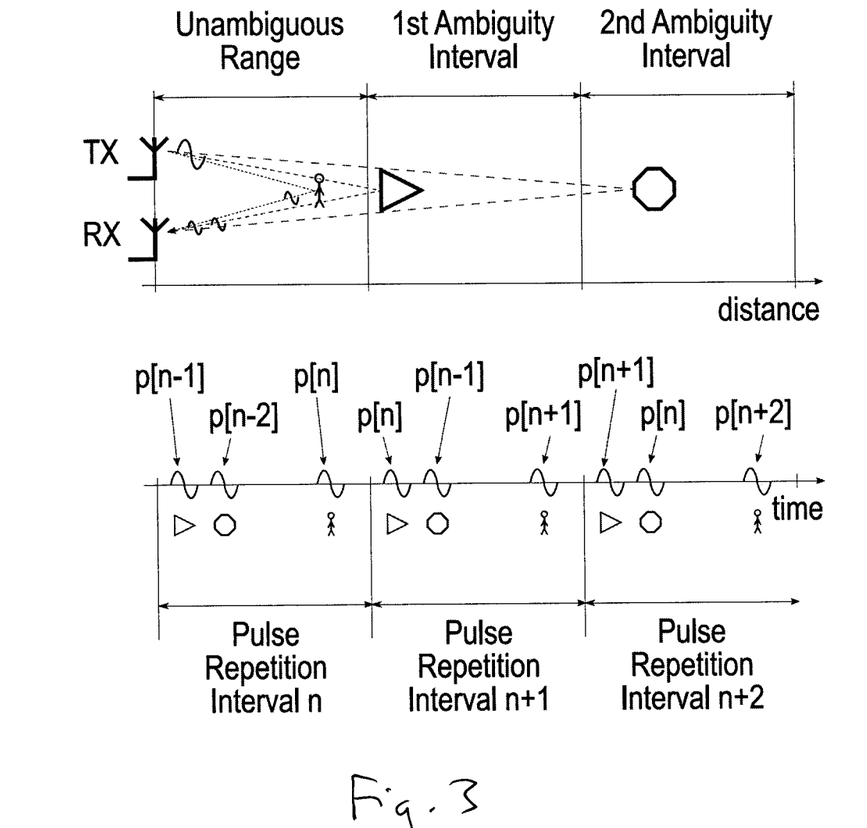
FIG. 3 illustrates the problem of range ambiguity.

FIG. 3 illustrates the range ambiguity problem. The pulses that reflect off the triangle-shaped object in the first ambiguity interval and off the octagon-shaped object in the second ambiguity interval appear in the sampled radar range profile as though they were actually inside the unambiguous range. The labels p[n], p[n−1] etc indicate the transmit pulse in the transmission sequence from which the reflection was generated. In pulse repetition interval n, we see reflections caused by pulses transmitted in the current interval (p[n], reflected off the person), as well as pulse repetition intervals n−1 (p[n−1], reflected off the triangle) and n−2 (p[n−2], reflected off the octagon). Similarly, in pulse repetition interval n+1, we see reflections caused by pulses transmitted in intervals n and n−1 in addition to the current interval.

Figure 4:
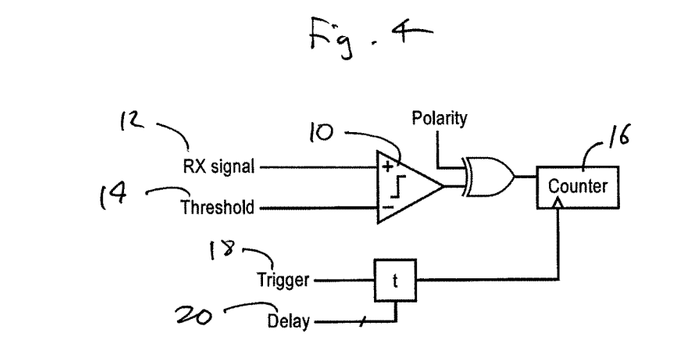
FIG. 4 shows a swept-threshold receiver architecture employing biphase coding.

The use of bi-phase coding in a swept-threshold receiver can result in distorted results. FIG. 4 shows a swept threshold receiver where the output of the comparator is XOR'ed with the polarity of the pulse to recover the signal. When a +1 pulse is received, polarity is 0, and when a −1 pulse is received, polarity is 1.

Figure 5:
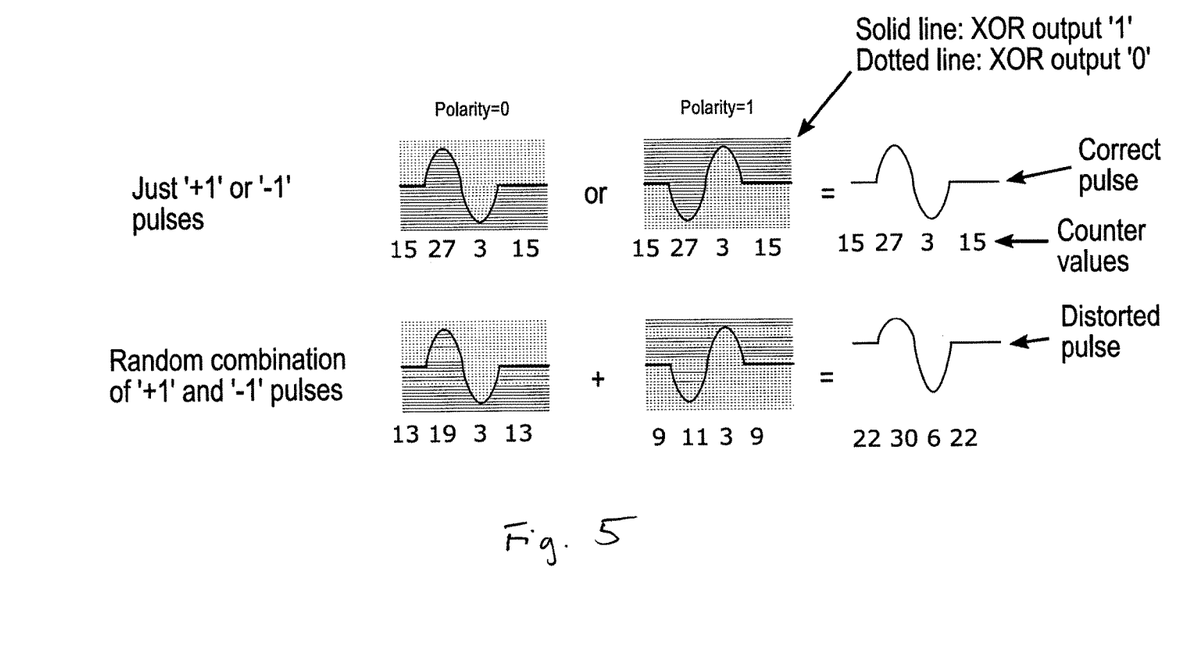
FIG. 5 illustrates a problem with using a swept-threshold receiver with biphase coding.

In the case where only +1 pulses or only −1 pulses are transmitted, the signal can be recovered without distortion (top row of FIG. 5). However, as discussed above, the use of only +1 or only −1 pulses results in range ambiguity problems. However, when a random combination of +1 and −1 pulses is transmitted (e.g. for biphase coding), attempts to recover the original signal result in a signal that appears distorted (bottom row of FIG. 5).

To explain this further, the top left graph of FIG. 5 shows how the range profile is received and measured when only +1 pulses (polarity=0) are sent (i.e. no −1 pulses are sent at all). The horizontal lines indicate the various thresholds against which the receive signal is compared. The horizontal axis is time and multiple samples are taken at different points along this line. Only four values are shown, but in reality many more samples are taken. The solid lines show where the comparison of the receive signal with the threshold is positive (i.e. the receive signal is higher than the threshold), which results in the counter being incremented. As can be seen, there is a perfect match between the pulse shape and the threshold comparisons. The four example counter values 15, 27, 3 and 15 indicate the average signal amplitude, peak signal amplitude, minimum signal amplitude and average signal amplitude again.

The top right graph of FIG. 5 shows the same scenario, but where only −1 pulses (polarity=1) are sent. The polarity input to the XOR gate in FIG. 4 inverts the comparison so that the counter is incremented when the receive signal is below the threshold value. Again, the inverted pulse shape is perfectly analysed and the reproduced signal is the same as for the top left graph, i.e. the four representative counter values are again 15, 27, 3, 15.

However, when dual polarities (i.e. a mixture of polarities) are used, both the +1 pulses and −1 pulses must be detected and summed in the counter. Therefore in the bottom row of FIG. 5, the left graph and the right graph are both counted. The left graph shows the +1 (polarity=0) pulses and the right graph shows the −1 (polarity=1) pulses. The threshold is still swept from low to high in the same manner, but due to the inversion of the pulses and the randomisation of polarities, the comparison results in a counter value that includes some randomisation and does not exactly represent the amplitude of the received signal. Only one pulse polarity can be sent at a time, so for a given position in the sweep, only either the left or the right image gets a result from the comparator. This is why there are "missing lines" (shown as dotted lines in FIG. 5) in these two images. Both the left and the right image therefore have uneven sweeps of the pulse, which gives a distorted signal in both of them. When the results from the two images are added together, the distortions will unfortunately not balance out. Hence, the four corresponding example measures count 13, 19, 3, 13 for the +1 pulse and 9, 11, 3, 9 for the −1 pulse, giving overall totals of 22, 30, 6, 22 as shown on the far right detected waveform which is distorted compared with the transmitted waveforms.

This distortion effect does not only apply to the reconstruction of intended pulses, but also to the cancellation of unwanted ghost pulses. The interaction between the code sequence and the threshold sweep will cause problems in a similar fashion to the above explanation for intended pulses. Codes that give good or perfect cancellation of ghost pulses in classic receivers cannot therefore be expected to work very well in swept threshold systems.

According to a first aspect, the invention provides a pulsed radar comprising a transmitter; wherein the pulsed radar is arranged to generate a string of binary values; wherein the transmitter comprises a pulse generator arranged to generate a pulse signal comprising a series of transmit pulses with polarities determined in accordance with the string of binary values; wherein a first substring comprises a first series of values; wherein a second substring comprises a second series of values; wherein the second substring is different from the first substring; and wherein each value in the second series of values is either the same as or different from the corresponding value in the first series of values according to a repeating pattern; and wherein the string of binary values comprises at least the first substring and the second substring concatenated together and each optionally being reversed before concatenation;

By transmitting two related series of pulses, the transmitter can achieve better noise cancellation and/or better rejection of reflections from unwanted ambiguity ranges. The repeating pattern can be selected so as to form a relationship between the polarities of reflections from one ambiguity range as they appear in a different ambiguity range. This relationship can be used to ensure cancellation of unwanted pulse reflections, while ensuring that the reflections of interest are summed, i.e. reinforced. The repeating pattern may be a series of instructions as to whether to copy or invert a given value. The pattern generally will have a length significantly shorter than the length of the substrings such that the pattern is repeated many times in the formation of the various substrings. One substring may be formed from another by starting from the beginning of one substring, taking each value of the substring in turn and either copying that value into the corresponding place in the new substring or inverting it before placing it in the corresponding place in the new substring, the copying or inverting being chosen according to the repeating pattern, then moving on to the next substring value and the next repeating pattern instruction and repeating this process for the full length of the substring. As noted elsewhere, the substring can optionally be reversed. In some examples the pattern length may be 1 (although as the second substring cannot be the same as the first substring, in this case the pattern would have to be to invert each bit). The repeating pattern may for example have a length of two, four, eight or sixteen bits. Where several patterns are employed to generate several substrings, the patterns need not all have the same pattern length.

It will be appreciated that the two substrings are preferably of equal length such that the relationship is preserved across the whole series.

The order in which the two substrings are concatenated is not important as it is the order of pulses within each substring that determines the desired properties and effects.

For a classic system, i.e. a system not using swept threshold sampling, each substring can also be reversed at will, since we are concerned with autocorrelation properties and since the autocorrelation function is always symmetric. Thus, after forming of the first and second (and optionally further) substrings, each substring may optionally be reversed (i.e. the order of its bits reversed) before the concatenation takes place. Any or all (or none) of the substrings may be reversed in this manner.

It will be appreciated that two substrings is the minimum to define a relationship, but there may be a plurality of substrings in which case there may be other substrings interposed between the first and second substrings. Again the order of concatenation is not important here. Also, any or all of the substrings may be reversed before concatenation.

In many cases the repeating pattern will be used to generate one substring from the other (or from another in the case of three or more substrings) as this provides an easy way to create the required set of substrings. However, it will be appreciated that in some cases the substrings may be generated simultaneously or from different sources with the relationship already built in. For example in the case where one substring is simply the inverse of the other the two substrings may be generated by inverted outputs of a single device without having to generate one substring from the other.

As just indicated, in some embodiments the first substring may be the inverse of the second substring. A particular benefit of this arrangement is that the number of pulses of each polarity is equal. This alleviates the problems described above in relation to FIG. 5. In particular this strategy eliminates the pulse distortion that arises in a swept-threshold system as it may be used to provide effectively a full sweep with only positive polarity pulses (which results in an undistorted signal as shown in the upper left of FIG. 5) plus a full sweep with only negative polarity pulses (which also results in an undistorted signal as shown in the upper centre of FIG. 5). It should be noted that the order in which the two pulse streams are concatenated does not matter. What matters is that each threshold level is evaluated by an equal number of positive polarity pulses and negative polarity pulses, whatever order those are transmitted in. As the resulting received pulse waveforms are undistorted, onward signal processing is much easier and more reliable.

In other embodiments the values of the second substring may be alternately equal to the corresponding value of the first substring and equal to the inverse of the corresponding value if the first substring. Thus the repeating pattern may be seen as an alternation of copying and inverting operations. This pair of substrings has the advantage of cancelling pulses received from adjacent ambiguity ranges. However, it may not have the benefit of equal polarity counts described above.

In preferred embodiments the string of binary values comprises a plurality of substrings concatenated together wherein the plurality of substrings are related to each other such that when all pulses are accumulated in a receiver, pulses from at least one ambiguity range are cancelled while pulses from at least one different ambiguity range are summed. The above-described pair of substrings with one substring alternately the same and different from the other is one example of this, but other sets of substrings may be generated with different relationships (different repeating patterns) that are selected so as to cancel particular ambiguity ranges while reinforcing other ambiguity ranges.

In general, the cancellation of several ambiguity ranges is desirable so as to minimise the unwanted reflections that threaten to mask the signal of interest. In particular, it is generally the adjacent ambiguity ranges that will have the largest effect. Therefore in some preferred embodiments the plurality of substrings are related to each other such that pulses from at least two adjacent ambiguity ranges are cancelled while pulses from at least one different ambiguity range are summed. A few specific examples of particularly useful strings will be particularly described here. However, it will be appreciated that these are not limiting on the invention and that the principles set out here may be extended to other useful combinations of substrings.

In some embodiments the string of binary values may comprise at least four substrings concatenated together, wherein values of a second substring are the inverse of corresponding values in a first substring, wherein values of a third substring are alternately equal to the corresponding value of the first substring and equal to the inverse of the corresponding value of the first substring, and wherein values of a fourth substring are the inverse of corresponding values in the third substring. This arrangement has both of the benefits described above, namely cancellation of a set of ambiguity ranges (the odd-numbered ambiguity ranges) as well as having the same pattern fully inverted such that the string as a whole has an equal number of positive and negative polarity pulses.

In some embodiments the string of binary values comprises at least eight substrings concatenated together, wherein the first to fourth substrings are as set out immediately above and wherein values of a fifth substring are formed by dividing the first substring into adjacent groups of four adjacent values starting from the beginning of the first substring and forming the corresponding group of the fifth substring by copying the first two values of the group and inverting the last two values of the group, wherein values of a sixth substring are the inverse of corresponding values in the fifth substring, wherein values of a seventh substring are formed by dividing the first substring into adjacent groups of four adjacent values starting from the beginning of the first substring and forming the corresponding group of the seventh substring by copying the first and last values of the group and inverting the middle two values, and wherein values of an eighth substring are the inverse of corresponding values in the seventh substring. This arrangement is similar to the arrangement described above, but with the additional cancellation of other ambiguity ranges, namely the $2^{nd}$, $6^{th}$, $10^{th}$, etc.

Each substring may be a predefined pattern of values. In a very simple form, one substring may simply be all or all '1's or all '−1's. However, for the purpose of spectrum spreading it is preferred to have the string of values be a random or pseudo-random string of binary values. This can be achieved by each substring being a random or pseudo-random string of binary values (albeit each substring being related to the others in some way). Preferably each substring has a length of at least 20 pulses, more preferably at least 50 pulses or at least 100 pulses. In some embodiments each substring has a length of at least 1000 or even at least 2000 values.

The pulsed radar preferably further comprises: a receiver comprising a signal combining device that combines the received signal with a chopping signal that switches at the pulse repetition frequency between a positive voltage and a negative voltage in accordance with the binary values of the string so as to recover the signal from a desired ambiguity range. The receiver reapplies the string of values that was used to define the transmit polarities so that it can accurately receive the reflected signal based on the expected polarities from the ambiguity range of interest.

The transmit pulses may be equally spaced in time, i.e. with no temporal staggering or spreading of the pulse repetition interval. Where sufficient noise cancellation is achieved through the bi-phase coding scheme that no additional pulse spreading is necessary, the transmitter architecture can be simplified. Of course it will be appreciated that pulse staggering may be used in addition to these techniques if desired.

The above techniques may be applied to any pulsed radar system, regardless of the receiver architecture. However, as discussed above, the techniques here have particular benefits in a swept-threshold receiver architecture. Accordingly, in some preferred embodiments the receiver comprises a quantizer arranged to receive the received signal and a threshold signal and arranged to output a binary value quantized signal based on a comparison of the received signal with the threshold signal and wherein the threshold is swept through a defined range of voltages at least once for each substring.

In particular, the use of coding schemes (i.e. coding patterns) that ensure equal numbers of positive and negative polarities for each threshold value are beneficial for swept-threshold architectures as this eliminates the pulse distortion problems described above in relation to FIG. 5.

In preferred embodiments the length of each substring is equal to an integer multiple of the number of discrete voltages in the sweep through the defined range of voltages. There may be a single pulse transmitted at each threshold level, in which case the length of the substring is exactly equal to the number of voltage thresholds being tested, or there may be a plurality of pulses transmitted at each threshold in which case the substring length must be equal to the number of voltage thresholds multiplied by the number of pulses transmitted at each level so that the substring length is equal to the number of pulses transmitted during a sweep. If one pulse is transmitted per threshold level, each threshold level will be evaluated an equal number of times with positive and negative pulse polarities, as discussed earlier. If e.g. ten pulses are transmitted per threshold level, each threshold level will be evaluated with ten times as many positive pulses and ten times as many negative pulses, i.e. still with an equal number of positive and negative pulses.

According to another aspect the invention provides a method of transmitting pulses in a pulsed radar, comprising: generating a string of binary values; and transmitting a series of transmit pulses with polarities determined in accordance with the string of binary values; wherein a first substring comprises a first series of values; wherein a second substring comprises a second series of values; wherein the second substring is different from the first substring; and wherein each value in the second series of values is either the same as or different from the corresponding value in the first series of values according to a repeating pattern; and wherein the string of binary values comprises at least the first substring and the second substring concatenated together and each optionally being reversed before concatenation;

It will be appreciated that all of the preferred and optional features described above in relation to the apparatus may also be applied to the method.

According to another aspect, the invention provides a pulsed radar comprising a transmitter and a receiver; wherein the transmitter comprises a pulse generator arranged to generate a pulse signal comprising a series of transmit pulses at a pulse repetition frequency, a pseudo-random string of binary values and a chopping signal that switches at the pulse repetition frequency between a positive voltage and a negative voltage in accordance with the binary values of the pseudo-random string; wherein the transmitter multiplies the pulse signal by the chopping signal to generate a transmit signal comprising pulses of two polarities; wherein the receiver comprises an amplifier that amplifies its received signal to generate an amplified signal and a multiplier that multiplies the amplified signal by a delayed version of the chopping signal.

According to a further aspect, the invention provides a pulsed radar comprising a transmitter and a receiver; wherein the transmitter comprises a pulse generator arranged to generate a pulse signal comprising a series of transmit pulses at a pulse repetition frequency with polarities determined in accordance with a pseudo-random string of binary values; wherein the receiver comprises a signal combining device that combines the received signal with a chopping signal that switches at the pulse repetition frequency between a positive voltage and a negative voltage in accordance with the binary values of the pseudo-random string.

The chopping signal is a pseudo-random waveform rather than a regular conventional square waveform that is used in the traditional chopping applications described above with reference to FIG. 1. Whereas the conventional applications of chopping have no reason to use an irregular signal, the present invention recognises that the pseudo-random waveform achieves the same effect of allowing the amplifier offset to be eliminated, while also implementing bi-phase coding to remove aliasing from ambiguity ranges that are not of interest.

The benefits of applying the chopping are to remove unwanted offsets and low-frequency noise that is acquired between the two applications of the chopping signal. It is desirable to eliminate as much of this noise as possible, and therefore it is preferred to include as many problematic components as possible between the two applications of the chopping signal, in particular those that introduce dc offsets and/or 1/f noise. The analog components are typically more problematic and therefore preferably at least one analog component is upstream of the second chopping signal application. Amplifiers are generally one of the largest contributors of noise and therefore preferably at least one amplifier (and preferably all amplifiers) are upstream of the second chopping signal application. The second chopping signal may be applied while the signal is still in an analog form. However, it can also be applied after the signal has been digitised. The latter is in fact preferred in many embodiments as it ensures that all analog components are upstream of the second chopping signal application.

It will be appreciated that this system may be used in conjunction with pulse staggering methods (i.e. temporally varying the pulse repetition interval to cause smearing of the received pulses from ambiguity ranges that are not of interest). However, using the biphase coding of this invention, pulse staggering can be avoided and therefore preferably the transmit pulses are equally spaced in time (i.e. transmitted at a regular PRI).

In preferred embodiments the receiver may be a swept-threshold receiver as described above, i.e. a system where multiple pulses are transmitted in succession and the receiver performs a comparison of the received signal with a threshold that is varied between pulse transmissions. Thus in certain preferred embodiments the pulsed radar further comprises a quantizer downstream of the amplifier arranged to receive the amplified signal and a threshold signal and arranged to output a binary value quantized signal based on a comparison of the amplified signal with the threshold signal. The pulsed radar may further comprise: a plurality of samplers arranged to sample the quantized signal at a plurality of different times; and a plurality of counters each associated with a sampler and each arranged to increase its count or not increase its count based on the quantized signal.

In other embodiments, an amplifier may not be present and hence the pulsed radar may further comprise a quantizer arranged to receive the received signal and a threshold signal and arranged to output a binary value quantized signal based on a comparison of the received signal with the threshold signal. Further the pulsed radar may further comprising: a plurality of samplers arranged to sample the quantized signal at a plurality of different times; and a plurality of counters each associated with a sampler and each arranged to increase its count or not increase its count based on the sampled value.

The samplers may be provided either before or after the quantizer, or in some embodiments the sampler and quantizer may be provided as part of the same circuit. For example in some embodiments a StrongARM latch may be used which acts as a quantizer by rapidly amplifying the incoming signal to a rail voltage, and also acts as a sampler by holding that amplified signal level until the next clock trigger.

In some embodiments the received signal is fanned out to several parallel branches for further processing. For example where the signal is to be quantized and counted as part of a swept-threshold radar system, the several samplers/quantizers will typically operate in parallel so as to avoid the slow speed of the samplers/quantizers limiting the speed of the receiver as a whole. In such systems it is preferred that the second chopping signal is applied after the branching of the signal, i.e. downstream of the fanning out. In such implementations the second chopping signal may be applied to the digitized signal, i.e. downstream of all quantizers and/or samplers. Each counter is used to measure a particular range point in the received signal (i.e. a particular sampling time). The multiple counters are then combined together to form a time series of digital values each representing the amplitude of the received signal at the respective range point.

The pulsed radar may be arranged or configured to change the threshold at a sweep frequency and the pulse repetition frequency may be an integer multiple of the sweep frequency. That multiple may be one (i.e. one pulse is transmitted per threshold level), but in some preferred embodiments multiple pulses are transmitted for each threshold level. Using multiple pulses per threshold level provides processing gain which improves the signal to noise ratio of the final converted signal. The threshold voltage may be swept through a range of voltages. It will be appreciated that while a linear sweep is often the most convenient arrangement, this need not necessarily be the case. A non-linear sweep may be used, or the threshold voltage may be changed in any suitable sequence.

The number of voltage levels that may be tested in a full sweep will depend on the particular implementation And the expected dynamic range of the input signal. However, in some exemplary embodiments the sweep may include at least 40 levels. In some examples a full sweep may be over 1000 or over 2000 different voltage levels.

While the above methods may be used to implement biphase coding in a pulsed radar with reduced noise from the amplifier(s), there still remains the problem described above that the use of biphase coding in a swept-threshold system produces a distorted pulse in the received output. However, in preferred embodiments the pseudo-random string of binary values comprises a pair of substrings concatenated together and wherein values in a first substring are the inverse of corresponding values in a second substring, and wherein the threshold voltage is swept through its full range for each substring. With this arrangement, every threshold that is used to compare the received signal is tested with both a positive polarity pulse and a negative polarity pulse (or in cases where more than one pulse is transmitted per threshold level, an equal number of positive and negative polarity pulses are used per threshold level). This strategy eliminates the pulse distortion as it may be considered as a full sweep with only positive polarity pulses (which results in an undistorted signal as shown in the upper left of FIG. 5) plus a full sweep with only negative polarity pulses (which also results in an undistorted signal as shown in the upper centre of FIG. 5). It should be noted that the order in which the two pulse streams are concatenated does not matter. As the resulting reconstructed pulse waveforms are undistorted, onward signal processing is much easier and more reliable.

Extending this concept further can also be beneficial for removing unwanted ghost pulses (i.e. reducing the noise bumps that still appear in the received signal from ambiguity ranges that are not of interest). By repeating a given pseudo-random string with carefully chosen transformations, the undesired pulses can be cancelled out, removing the ghost pulses from the received signal. By transmitting a further two pulse streams, one formed from the base (original) pseudorandom sequence with alternating values inverted, and the other being formed as the inverse (so that the two new sequences also form a complete set of both polarities for each threshold), the four sequences combined have previous/next pulses that alternately add up and cancel out. Thus reflections that are received from those pulses (i.e. from alternate ambiguity ranges) can automatically be cancelled out. It will be appreciated that the choice of how to combine the four sequences will depend on which ambiguity ranges are to be cancelled. Either the closest range (Unambiguous Range) can be kept along with all even ambiguity ranges ($2^{nd}$, $4^{th}$, etc. ambiguity ranges) etc., while odd ambiguity ranges ($1^{st}$, $3^{rd}$, $5^{th}$, etc.) are cancelled, or the even ambiguity ranges (and the unambiguous range) can be cancelled while odd ambiguity ranges are retained. Accordingly in some preferred embodiments the pseudo-random string of binary values comprises a plurality of substrings concatenated together and wherein the substrings are related to each other such that pulses from at least one ambiguity range are cancelled while pulses from at least one different ambiguity range are summed. Preferably the threshold voltage is swept through its full range for each substring. Again it may be noted that it does not matter what order the substrings are concatenated.

In some particularly preferred embodiments the plurality of substrings are related to each other such that pulses from at least two adjacent ambiguity ranges are cancelled while pulses from at least one different ambiguity range are summed.

One set of sequences will have the effect of removing ghost pulses from multiple non-adjacent ambiguity ranges. For example, all odd or all even ambiguity ranges may be cancelled by the technique described above. Other sequences may remove the $2^{nd}$, $6^{th}$, $10^{th}$, etc., or the $4^{th}$, $8^{th}$, $12^{th}$, etc. These sequences may of course all be combined to effect removal of a large number of ghost pulses from the ambiguity ranges that are not of interest. Typically eliminating ghost pulses from the nearest one or two ambiguity ranges will be enough, especially if the desired range is the closest range. However, if it is desired to examine an ambiguity range further away from the transmitter, it may be necessary to eliminate pulses from all closer ranges as these will generally have higher amplitudes.

Two examples of such pulse streams are as follows:

In a first example, the pseudo-random string of binary values may comprise at least four substrings concatenated together, wherein values of a second substring are the inverse of corresponding values in a first substring, wherein values of a third substring are alternately equal to the corresponding value of the first substring and equal to the inverse of the corresponding value of the first substring, and wherein values of a fourth substring are the inverse of corresponding values in the third substring. This set of four related sequences will cancel ghost pulses from the $1^{st}$, $3^{rd}$, $5^{th}$, etc. ambiguity range intervals, while reinforcing those from the unambiguous range interval and the $2^{nd}$, $4^{th}$, $6^{th}$, etc. ambiguity range intervals.

In a second example, the pseudo-random string of binary values comprises at least eight substrings concatenated together, including the four substrings described above, and wherein values of a fifth substring are formed by dividing the first substring into adjacent groups of four adjacent values starting from the beginning of the first substring and forming the corresponding group of the fifth substring by copying the first two values of the group and inverting the last two values of the group, wherein values of a sixth substring are the inverse of corresponding values in the fifth substring, wherein values of a seventh substring are formed by dividing the first substring into adjacent groups of four adjacent values starting from the beginning of the first substring and forming the corresponding group of the seventh substring by copying the first and last values of the group and inverting the middle two values, and wherein values of an eighth substring are the inverse of corresponding values in the seventh substring. With this set of related sequences, in addition to cancelling the $1^{st}$, $3^{rd}$, $5^{th}$ etc. ambiguity range intervals, the $2^{nd}$, $6^{th}$, $10^{th}$, etc. ambiguity range intervals are also cancelled.

To further extend this sequence to cancel the $4^{th}$, $12^{th}$, $20^{th}$, etc. ambiguity range intervals, the eight sequences described above are copied and the copies are multiplied by (1, 1, 1, 1, −1, −1, −1, −1, 1, 1, 1, 1, . . . ) and then concatenated with the original eight sequences.

As above, the threshold voltage is preferably swept through its full range for each substring, and the order of concatenation of substrings does not matter.

For a classic system, i.e. a system not using swept threshold sampling, these codes give the freedom to use just part of a sequence (not requiring to use the whole m-sequence or ternary sequence). The tradeoff is that the sequence must be repeated a few times (e.g. four or eight times). Furthermore for classic systems, these codes give perfect ghost cancellation, unlike m-sequences, and don't have efficiency problems (zero-amplitude pulses) like ternary codes.

Preferred embodiments of the invention will now be described, by way of example only, and with reference to the accompanying drawings in which.

FIGS. 1 to 5 have been described above and therefore no further description is provided here.

Figure 6:
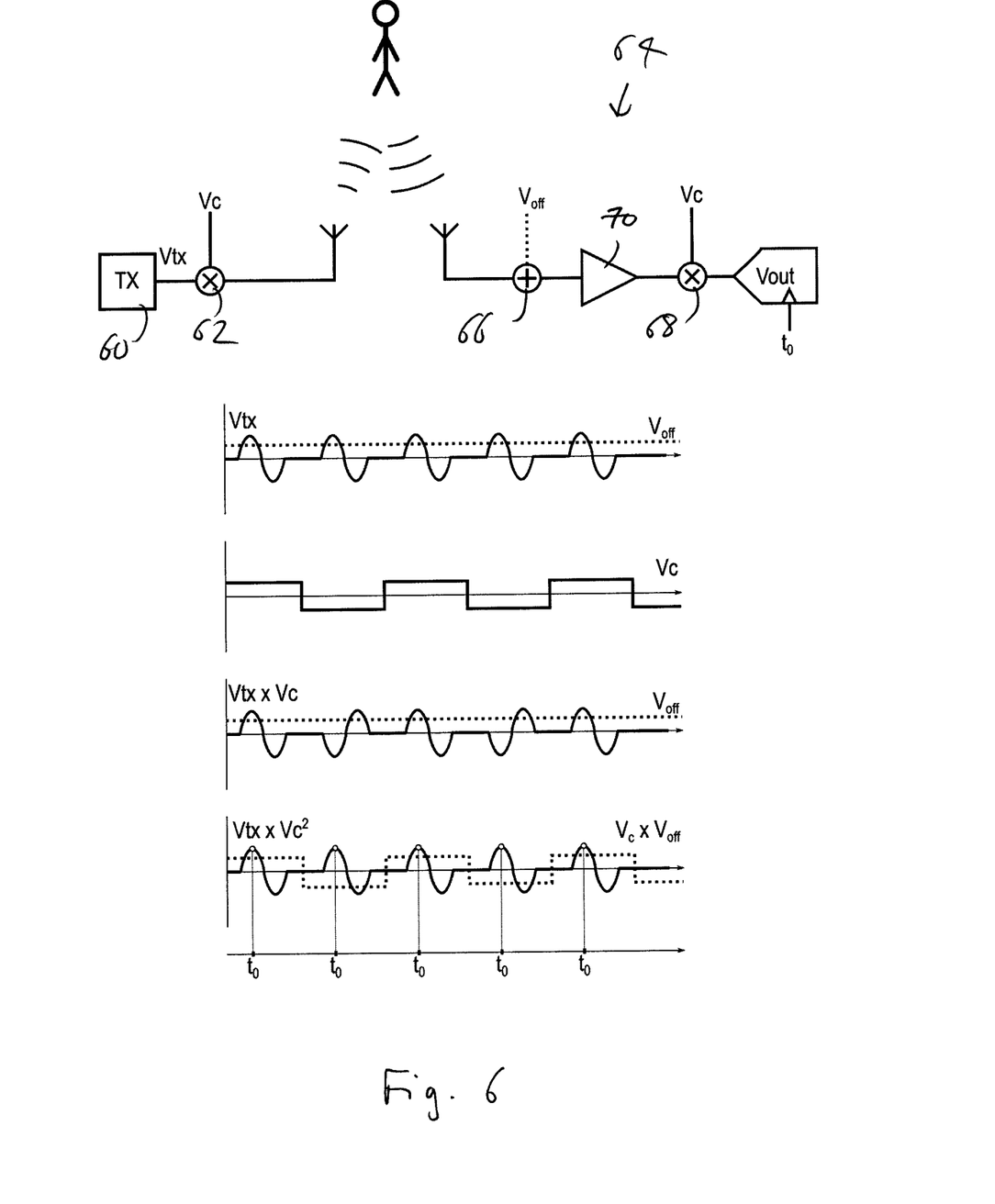
FIG. 6 shows a system architecture with chopping implemented at the system level.

FIG. 6 shows how the system implements signal chopping as part of the bi-phase coding scheme. The transmitter 60 generates pulses with either positive or negative polarity, conceptually shown here by multiplying positive only pulses with waveform Vc at 62. Vc alternates between +1 and −1 as illustrated in the second signal graph of FIG. 6. Notably, this first injection of the chopping signal Vc occurs on the transmitter side of the system, not on the receiver side of the system as would be the case in conventional signal chopping arrangements.

The receiver 64 receives these transmitted pulses and adds an unwanted offset, Voff to the signal at 66 (these being illustrated in the third signal graph of FIG. 6). This signal is then multiplied by the same waveform Vc at 68 after amplification by amplifier 70, thus generating a new signal Vout which consists of the original stream of positive only pulses, together with the Voff signal multiplied by Vc as shown in the fourth signal graph of FIG. 6.

The signal Vout is then sampled at regular intervals (indicated by t0 in FIG. 6), coherent with the pulse transmission. These samples are then summed up, averaging out the unwanted offset.

Thus, with this arrangement, the two injections of the chopping signal occur on opposite sides of the system, one on the transmit side and one on the receive side.

While the chopping signal, Vc shown in FIG. 6 is a regular square wave, alternating between +1 and −1, it will be appreciated that this was for illustration of the concept. In practical implementations the chopping signal is in fact a randomised square waveform which swaps between +1 and −1 in accordance with a pseudo-random sequence. The exact same pseudo-random sequence must of course be used on both sides of the system, i.e. at 62 and 68 in FIG. 6 and therefore the pseudo-random sequence must be stored and re-used or regenerated (e.g. from the same random number generator and the same seed) so that the transform applied on the transmit side is exactly reversed by the receive side. With a long enough pseudo-random sequence the number of positive and negative pulses can be expected to be roughly equal (i.e. it is expected to have a mean of zero) so that the averaging step eliminates (or at least significantly reduces) the unwanted offset Voff (as well as other noise).

This system-level chopping is well suited to pulsed radars where bi-phase coding is particularly useful technique for spectrum spreading. The offset cancellation may also be particularly beneficial in interleaved ADCs, where variations in offset between the individual ADCs can be a challenge.

As discussed above, while bi-phase coding can reduce the impact of pulses from other ambiguity ranges, they still appear in the received signal as ghost pulses in the form of a bump in the noise floor. By applying a more specific pattern to the chopping waveform Vc, a perfect cancellation of the ghost pulses can be achieved. The previously discussed pulse distortion can also be fixed. This is achieved by sending a second sequence of pulses which is the exact inverse of the original chopping sequence. Thus the pseudo-random sequence is inverted (+1 is changed to −1 and vice versa) and sent again immediately following the original sequence. The number of positive polarity pulses in the full sequence now exactly equals the number of negative polarity pulses in the full sequence. This eliminates the pulse distortion problem that was described in relation to FIG. 5 as every threshold has been tested with both a positive and a negative polarity pulse. The result of the counters is therefore the sum of the upper left graph and the upper right graph of FIG. 5, which recovers the pulse shape accurately, rather than the distorted results shown in the lower row of FIG. 5.

This process may be illustrated by sequence multipliers that show how the pseudo-random sequence is transformed to generate each new sequence. In the case described above, the two sequences are achieved with the following two multipliers:

Multiplier 1: 1, 1, 1, 1, 1, . . .
Multiplier 2: −1, −1, −1, −1, −1, . . .

This principle can be extended to effect cancellation of pulses from other ambiguity ranges that are not of interest. This is achieved by sending several sequence of pulses, each derived from the same base sequence (e.g. pseudo-random sequence), but with different transformations applied each time so as to cause reflections from different ambiguity ranges to add up or to cancel out.

For example, consider the following set of four sequences (which may be transmitted in any order):

Multiplier 1: 1, 1, 1, 1, 1, . . .
Multiplier 2: −1, −1, −1, −1, −1, . . .
Multiplier 3: 1, −1, 1, −1, 1, . . .
Multiplier 4: −1, 1, −1, 1, −1, . . .

Figure 7:
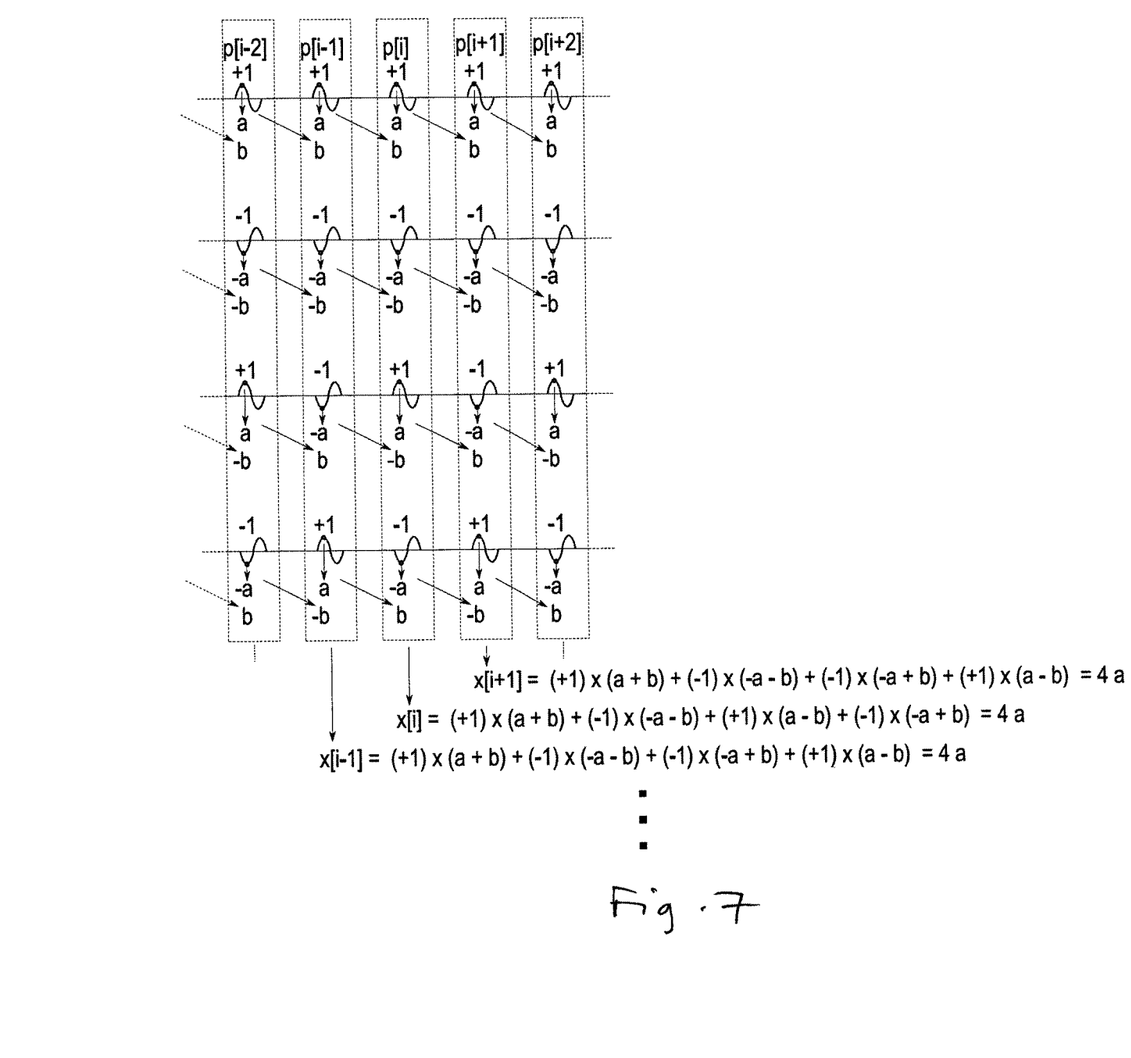
FIG. 7 illustrates how ghost pulses can be cancelled by appropriate pulse sequencing.

The effect of this set of sequences is shown in FIG. 7. In FIG. 7 'a' is the pulse received from a reflector in the unambiguous range interval (i.e. the desired pulse), and 'b' is the pulse received from a reflector in the first ambiguous range interval (the undesired pulse which we want to remove). The cancellation of the 'b' pulse is illustrated by summing the pulse samples from the same position in each sequence. The final result is found by summing all samples, which gives the desired result of exactly zero contribution from the 'b' pulse.

The four sequence pattern described above will cancel pulses from any odd-numbered ambiguity range interval (i.e. 1, 3, 5, etc.) More generally, pulses from any range interval can be cancelled by selecting the right set of codes. In order to cancel the reflections from the $2^{nd}$, $6^{th}$, $10^{th}$, etc. ambiguity range intervals, the above four sequences can be transmitted, followed by the same set again, but this time multiplying them all with (1, 1, −1, −1, 1, 1, . . . ), giving the following set of sequences:

Multiplier 1: 1, 1, 1, 1, 1, . . .
Multiplier 2: −1, −1, −1, −1, −1, . . .
Multiplier 3: 1, −1, 1, −1, 1, . . .
Multiplier 4: −1, 1, −1, 1, −1, . . .
Multiplier 5: 1, 1, −1, −1, 1, . . .
Multiplier 6: −1, −1, 1, 1, −1, . . .
Multiplier 7: 1, −1, −1, 1, 1, . . .
Multiplier 8: −1, 1, 1, −1, −1, . . .

This principle can be further extended to cancel pulses from the $4^{th}$, $12^{th}$, $20^{th}$, etc. ambiguity intervals by transmitting the above 8 sequences, then retransmitting those 8 sequences transformed by multiplying by (1, 1, 1, 1, −1, −1, −1, −1, 1, . . . ). This process may be repeated to generate patterns that will cancel pulses from other ambiguity intervals as needed.

These patterns have the particular property that the cancellation happens for each offset/position in the sequence, i.e. we don't need to look at the sequence as a whole to achieve the desired cancellation. (Except the first few positions which don't carry the necessary history.)

As discussed above, the fact that there is an equal number of positive and negative pulses at each offset/position in the sequence is a useful property in systems based on the swept threshold conversion technique. Because each threshold step is guaranteed to sample both positive and negative pulses the exact same number of times, no loss of data/additional distortion will occur.

The method will also cancel out unwanted pulses from "negative" ambiguity intervals; this is useful if you want to observe a range which does not start at 0 meters.

One particular advantage of this technique is that it makes bi-phase coding a suitable technique so that the transmitter can be designed as a bi-phase coding transmitter. This can be simpler and more cost-effective than the alternative of time staggering techniques (e.g. randomising the PRF). However, it will be appreciated that the technique described here can be combined with time staggering techniques too if desired.

The theoretically perfect cancellation of ghost pulses beyond the MUR is highly desirable. As mentioned above, with the conventional techniques, the unwanted pulse reflections create a bump in the noise floor and can potentially hide small but desired targets closer to the radar. However, these unwanted reflections can be largely eliminated or suppressed here, allowing much more reliable detection of small signal reflections.

Examples of Pseudorandom String Formation from Two Substrings

Consider the following pseudo-random substring (although it will be appreciated that this is short compared with most practical implementations):

First substring: 1, −1, −1, 1, −1, −1, 1, 1

Repeating Pattern (length 2): [1, −1] or equivalently [copy, invert]

A second substring formed from the first substring according to the repeating pattern is obtained by multiplying the values of the first substring by those of the pattern as follows:

$$1, -1, -1, 1, -1, -1, 1, 1$$
$$\times$$
$$[1, -1][1, -1][1, -1][1, -1]$$
$$=$$
$$1, 1, -1, -1, -1, 1, 1, -1$$

Thus we get:
second substring 1, 1, −1, −1, −1, 1, 1, −1

A full string may either be formed by concatenating the first substring and the second substring in either order and with either (or neither or both) being reversed prior to concatenation. Thus, for example:

First substring concatenated with second substring gives:
1, −1, −1, 1, −1, −1, 1, 1 :: 1, 1, −1, −1, −1, 1, 1, −1

Or, second substring concatenated with reversed first substring gives:
1, 1, −1, −1, −1, 1, 1, −1 :: 1, 1, −1, −1, 1, −1, −1, 1

The invention claimed is:

1. A pulsed radar comprising a transmitter;
wherein the pulsed radar is arranged to generate a string of binary values;
wherein the transmitter comprises a pulse generator arranged to generate a pulse signal comprising a series of transmit pulses with polarities determined in accordance with the string of binary values;
wherein a first substring comprises a first series of values;
wherein a second substring comprises a second series of values;
wherein the second substring is different from the first substring; and
wherein each value in the second series of values is either the same as or different from the corresponding value in the first series of values according to a repeating pattern; and
wherein the string of binary values comprises at least the first substring and the second substring concatenated together and each optionally being reversed before concatenation.

2. The pulsed radar as claimed in claim 1, wherein the first substring is the inverse of the second substring.

3. The pulsed radar as claimed in claim 1, wherein the values of the second substring are alternately equal to the corresponding value of the first substring and equal to the inverse of the corresponding value in the first substring.

4. The pulsed radar as claimed in claim 1, wherein the string of binary values comprises a plurality of substrings concatenated together and wherein the plurality of substrings are related to each other such that when all pulses are accumulated in a receiver, pulses from at least one ambiguity range are cancelled while pulses from at least one different ambiguity range are summed.

5. The pulsed radar as claimed in claim 4, wherein the plurality of substrings are related to each other such that pulses from at least two adjacent ambiguity ranges are cancelled while pulses from at least one different ambiguity range are summed.

6. The pulsed radar as claimed in claim 1, wherein the string of binary values comprises at least four substrings concatenated together, wherein values of a second substring are the inverse of corresponding values in a first substring, wherein values of a third substring are alternately equal to the corresponding value of the first substring and equal to the inverse of the corresponding value in the first substring, and wherein values of a fourth substring are the inverse of corresponding values in the third substring.

7. The pulsed radar as claimed in claim 6, wherein the string of binary values comprises at least eight substrings concatenated together, and wherein values of a fifth substring are formed by dividing the first substring into adjacent groups of four adjacent values starting from the beginning of the first substring and forming the corresponding group of the fifth substring by copying the first two values of the group and inverting the last two values of the group, wherein values of a sixth substring are the inverse of corresponding values in the fifth substring, wherein values of a seventh substring are formed by dividing the first substring into adjacent groups of four adjacent values starting from the beginning of the first substring and forming the corresponding group of the seventh substring by copying the first and last values of the group and inverting the middle two values, and wherein values of an eighth substring are the inverse of corresponding values in the seventh substring.

8. The pulsed radar as claimed in claim 1, wherein the string of binary values is a random or pseudo-random string of binary values.

9. The pulsed radar as claimed in claim 1, further comprising:
a receiver comprising a signal combining device that combines the received signal with a chopping signal that switches at the pulse repetition frequency in accordance with the binary values of the string so as to recover the signal from a desired ambiguity range.

10. The pulsed radar as claimed in claim 1, wherein the transmit pulses are equally spaced in time.

11. The pulsed radar as claimed in claim 1, wherein the receiver comprises a quantizer arranged to receive the received signal and a threshold signal and arranged to output a binary value quantized signal based on a comparison of the received signal with the threshold signal and wherein the threshold is swept through a defined range of voltages at least once for each substring.

12. The pulsed radar as claimed in claim 11, wherein the length of each substring is equal to an integer multiple of the number of discrete voltages in the sweep through the defined range of voltages.

13. A method of transmitting pulses in a pulsed radar, comprising:
generating a string of binary values; and
transmitting a series of transmit pulses with polarities determined in accordance with the string of binary values;
wherein a first substring comprises a first series of values;
wherein a second substring comprises a second series of values;
wherein the second substring is different from the first substring; and
wherein each value in the second series of values is either the same as or different from the corresponding value in the first series of values according to a repeating pattern; and
wherein the string of binary values comprises at least the first substring and the second substring concatenated together and each optionally being reversed before concatenation.

14. The method as claimed in claim 13, wherein the first substring is the inverse of the second substring.

15. The method as claimed in claim 13, wherein the values of the second substring are alternately equal to the corresponding value of the first substring and equal to the inverse of the corresponding value in the first substring.

16. The method as claimed in claim 13, wherein the string of binary values comprises a plurality of substrings concatenated together and wherein the plurality of substrings are related to each other such that when all pulses are accumulated in a receiver, pulses from at least one ambiguity range are cancelled while pulses from at least one different ambiguity range are summed.

17. The method as claimed in claim 16, wherein the plurality of substrings are related to each other such that pulses from at least two adjacent ambiguity ranges are cancelled while pulses from at least one different ambiguity range are summed.

18. The method as claimed in claim 13, wherein the string of binary values comprises at least four substrings concatenated together, wherein values of a second substring are the inverse of corresponding values in a first substring, wherein values of a third substring are alternately equal to the corresponding value of the first substring and equal to the inverse of the corresponding value if in the first substring, and wherein values of a fourth substring are the inverse of corresponding values in the third substring.

19. The method as claimed in claim 18, wherein the string of binary values comprises at least eight substrings concatenated together, and wherein values of a fifth substring are formed by dividing the first substring into adjacent groups of four adjacent values starting from the beginning of the first substring and forming the corresponding group of the fifth substring by copying the first two values of the group and inverting the last two values of the group, wherein values of a sixth substring are the inverse of corresponding values in the fifth substring, wherein values of a seventh substring are formed by dividing the first substring into adjacent groups of four adjacent values starting from the beginning of the first substring and forming the corresponding group of the seventh substring by copying the first and last values of the group and inverting the middle two values, and wherein values of an eighth substring are the inverse of corresponding values in the seventh substring.

20. The method as claimed in claim 13, wherein the string of binary values is a random or pseudo-random string of binary values.

21. The method as claimed in claim 13, further comprising:
    receiving a received signal; and
    combining the received signal with a chopping signal that switches at the pulse repetition frequency in accordance with the binary values of the string so as to recover the signal from a desired ambiguity range.

\* \* \* \* \*